US012728073B2

(12) United States Patent
Voellmicke et al.

(10) Patent No.: US 12,728,073 B2
(45) Date of Patent: Sep. 8, 2026

(54) BLISTER PACKAGES CONTAINING ACTIVE MATERIAL AND METHODS OF MAKING AND USING SAME

(71) Applicant: CSP TECHNOLOGIES, INC., Auburn, AL (US)

(72) Inventors: Craig Voellmicke, Auburn, AL (US); Ralf Kibele, Holzkirchen (DE)

(73) Assignee: CSP TECHNOLOGIES, INC., Auburn, AL (US)

( * ) Notice: Subject to any disclaimer, the term of this patent is extended or adjusted under 35 U.S.C. 154(b) by 433 days.

(21) Appl. No.: 16/483,859

(22) PCT Filed: Feb. 6, 2018

(86) PCT No.: PCT/US2018/017084
§ 371 (c)(1),
(2) Date: Aug. 6, 2019

(87) PCT Pub. No.: WO2018/145099
PCT Pub. Date: Aug. 9, 2018

(65) Prior Publication Data

US 2020/0016034 A1 Jan. 16, 2020

Related U.S. Application Data

(60) Provisional application No. 62/455,236, filed on Feb. 6, 2017.

(51) Int. Cl.
*A61J 1/03* (2023.01)
*B65B 1/02* (2006.01)
(Continued)

(52) U.S. Cl.
CPC ................. *A61J 1/035* (2013.01); *B65B 1/02* (2013.01); *B65D 75/327* (2013.01); *B65D 81/267* (2013.01)

(58) Field of Classification Search
CPC .................................................. B65D 75/585
(Continued)

(56) References Cited

U.S. PATENT DOCUMENTS 3,343,897 A 9/1967 Walther
3,503,493 A * 3/1970 Nagy .................... B65D 75/54 206/232

(Continued)

FOREIGN PATENT DOCUMENTS

AU 2014005172 * 1/2014 .......... B65D 75/327
DE 1544098 A1 1/1971

(Continued)

OTHER PUBLICATIONS

International Search Report and Written Opinion of PCT/US2020-012818 mailed May 12, 2020.

*Primary Examiner* — Andrew D Perreault
(74) *Attorney, Agent, or Firm* — Mark T. Vogelbacker; Eckert Seamans Cherin & Mellott, LLC

(57) ABSTRACT

A blister pack having a backing having a first side and an opposing second side. Each of the first and second side is flat or planar. The blister pack can also include a cover having a first side and an opposing second side. At least a portion of the second side of the cover is adhered to the first side of the backing to form a sealed package for containing product. The cover can include at least one blister. Each blister can have a dome portion and a base portion. The base portion can surround the dome portion. The base portion can extend outwardly beyond the first side of the cover. The blister pack can also include an active member positioned within the base portion of each blister.

19 Claims, 5 Drawing Sheets

(51) Int. Cl.
*B65D 75/32* (2006.01)
*B65D 81/26* (2006.01)

(58) Field of Classification Search
USPC ............................................ 206/204, 524.8
See application file for complete search history.

(56) References Cited

U.S. PATENT DOCUMENTS

| | | | | | |
|---|---|---|---|---|---|
| 4,574,954 | A | | 3/1986 | Grahame | |
| 4,815,602 | A | * | 3/1989 | Schirmer | B65B 11/52 206/471 |
| 5,911,937 | A | | 6/1999 | Hekel | |
| 6,080,350 | A | | 6/2000 | Hekel | |
| 6,124,006 | A | | 9/2000 | Hekel | |
| 6,130,263 | A | | 10/2000 | Hekel | |
| 6,194,079 | B1 | | 2/2001 | Hekel | |
| 6,214,255 | B1 | | 4/2001 | Hekel | |
| 6,279,736 | B1 | | 8/2001 | Hekel | |
| 6,486,231 | B1 | | 11/2002 | Hekel | |
| 7,005,459 | B2 | | 2/2006 | Hekel | |
| 7,387,205 | B1 | * | 6/2008 | Wilson | B65D 33/2591 206/204 |
| 7,395,923 | B2 | * | 7/2008 | Chou | B65D 81/262 206/204 |
| 8,142,603 | B2 | | 3/2012 | Sagona et al. | |
| 2002/0112449 | A1 | | 8/2002 | Heath et al. | |
| 2012/0264580 | A1 | | 10/2012 | Engelhardt | |
| 2013/0217142 | A1 | | 8/2013 | Farge et al. | |
| 2016/0039955 | A1 | | 2/2016 | Klein et al. | |

FOREIGN PATENT DOCUMENTS

| | | | | | |
|---|---|---|---|---|---|
| DE | 20204067 | U1 | | 7/2003 | |
| DE | 102015218216 | A1 | | 3/2017 | |
| EP | 0370755 | A1 | | 5/1990 | |
| EP | 0466068 | A2 | | 1/1992 | |
| EP | 1803659 | A1 | | 7/2007 | |
| EP | 2511075 | A1 | | 9/2013 | |
| FR | 2660634 | A1 | | 10/1991 | |
| FR | 2005095216 | | * | 10/2005 | B65D 81/267 |
| JP | H0571161 | U | | 9/1993 | |
| JP | H0592171 | U | | 12/1993 | |
| JP | H0594167 | U | | 12/1993 | |
| JP | 2012149050 | A | | 8/2012 | |
| JP | 2012206776 | A | | 10/2012 | |
| JP | 2017119533 | A | | 7/2017 | |
| WO | 2005/095216 | A1 | | 10/2005 | |
| WO | 2009/013505 | A1 | | 1/2009 | |
| WO | 2011052422 | A1 | | 3/2013 | |
| WO | 2017050537 | A1 | | 3/2017 | |

* cited by examiner

BLISTER PACKAGES CONTAINING ACTIVE MATERIAL AND METHODS OF MAKING AND USING SAME

CROSS-REFERENCE TO RELATED APPLICATIONS

This application is a U.S. National Phase of International Application No. PCT/US2018/017084 filed Feb. 6, 2018, which claims priority to U.S. Provisional Patent Application No. 62/455,236 filed Feb. 6, 2017, which are incorporated herein by reference in their entirety.

FIELD

The presently disclosed technology relates to blister packages for product, such as pills, tablets, capsules and the like. Each package has a cover, which can be optionally formed of a thermoformed material, bonded to backing, which can optionally include an aluminum foil component.

BACKGROUND AND DESCRIPTION OF RELATED ART

Blister packaging is commonly used to package oral solid dose medications, vitamins, probiotics, pills, tablets, capsules, and the like. Prior art packaging includes a thermoformed material, which holds the product, and a foil attached to an open side thereof to enclose the product. Blister packaging or "blister packs" are typically used both by pharmaceutical companies and smaller health care facilities. Blister packs are also manufactured by companies in the business of providing unfilled blister packs for filling by third parties.

It is known to place a desiccant or scavenger extruded film in a blister pack. The size and shape of the desiccant or scavenger extruded film may be called the footprint of the film, and in the prior art is at least slightly less than the opening of the blister containing the product. One such blister package with desiccant film is disclosed in U.S. Pat. No. 6,279,736 (Hekal), which is hereby incorporated by reference. FIG. 1 shows another prior art blister pack 10 having four blisters 18. FIG. 2 shows a cross-sectional view through line 2-2 of FIG. 1, and shows a thermoplastic member 14, forming one of the blisters 18, adhered to foil backing 12. Extruded desiccant film 16 having a width $W_{PA}$ (see FIG. 2) less than that of a single blister 18 is adhered to the foil backing 12.

In conventional blister packaging, the desiccant or scavenger capacity of the film is limited by the opening of the blister.

BRIEF SUMMARY

There is a need to increase the desiccant or scavenger capacity of a blister package. This and other needs are addressed by the presently disclosed technology, which includes, in one aspect, a blister pack having a thermoformed cover and a foil backing. The cover can be attached or bonded to the foil backing to form a sealed unit package for containing a product. The cover can have at least one blister cavity with an open side. The foil backing can have a side bonded to the cover. The blister cavity can have a blister or dome portion and a base portion. The base portion can be wider and/or longer than the blister portion.

The blister pack can further include an extruded film. In one embodiment, the extruded film can be adhered to the side of the foil backing bonded to the cover. The extruded film can have a shape approximating the base portion. The extruded film can include a desiccant or oxygen scavenger.

In another aspect, the presently disclosed technology can include a method of making a blister pack. In one embodiment, the method can include attaching or bonding a thermoformed cover to a foil backing to form a sealed unit package. The cover can have at least one blister cavity containing a product. The at least one blister cavity can have an open side. The blister cavity can have a blister or dome portion and a base portion. The base portion can be wider and/or longer than the blister portion.

In one embodiment, the method can include attaching or adhering an extruded film to a side of the foil backing, which is then attached or bonded to the thermoformed cover. In another embodiment, the extruded film is not adhered to the foil backing.

In another aspect, the presently disclosed technology includes a backing and a cover attached to the backing that forms at least one sealed cavity for containing product. The sealed cavity includes a dome portion and a base portion. At least a section of the base portion extends laterally outwardly beyond the dome portion in a first direction. The dome portion extending upwardly beyond an outer peripheral portion of the cover in a second direction. At least one active member is positioned within at least the base portion of the sealed cavity.

In yet another aspect, the presently disclosed technology includes a blister pack including a backing and a cover having at least one blister with a dome portion and a base portion. At least a section of the base portion extends outwardly beyond the dome portion in a first direction. The base portion extends outwardly beyond an outer peripheral portion of the cover in a second direction. The second direction is perpendicular to the first direction. The cover is attached to the backing to form a sealed package for containing product in the dome portion of the blister. At least one active member is positioned within at least the base portion of the blister.

In still a further aspect, the presently disclosed technology includes a blister pack including a backing and a cover attached to the backing. The combined cover and backing form at least one sealed cavity for containing product. The sealed cavity includes a dome portion and a base portion. At least a section of the base portion extends beyond the dome portion in a first direction. The dome portion extends beyond an outer peripheral portion of the cover in a second direction. The second direction is perpendicular to the first direction. At least one active member is positioned within at least the base portion of the sealed cavity.

Optionally, in any embodiment, the product contained in a blister of a blister pack may include a pill, which is optionally a medicine, a nutritional supplement or a probiotic, for example.

BRIEF DESCRIPTION OF THE DRAWINGS

The foregoing summary, as well as the following detailed description of the presently disclosed technology, will be better understood when read in conjunction with the appended drawings, wherein like numerals designate like elements throughout. For the purpose of illustrating the presently disclosed technology, there are shown in the drawings various illustrative embodiments. It should be understood, however, that the presently disclosed technology is not limited to the precise arrangements and instrumentalities shown. In the drawings.

DETAILED DESCRIPTION

While systems, devices and methods are described herein by way of examples and embodiments, those skilled in the art recognize that the presently disclosed technology is not limited to the embodiments or drawings described. Rather, the presently disclosed technology covers all modifications, equivalents and alternatives falling within the spirit and scope of the appended claims. Features of any one embodiment disclosed herein can be omitted or incorporated into another embodiment.

Any headings used herein are for organizational purposes only and are not meant to limit the scope of the description or the claims. As used herein, the word “may” is used in a permissive sense (i.e., meaning having the potential to) rather than the mandatory sense (i.e., meaning must). Unless specifically set forth herein, the terms “a,” “an” and “the” are not limited to one element but instead should be read as meaning “at least one.” A first direction $D_1$ and a second direction $D_2$ are shown in certain drawings for reference and clarity only, and are not part of the structure of the presently disclosed technology. The terminology includes the words noted above, derivatives thereof and words of similar import.

Figure 3:
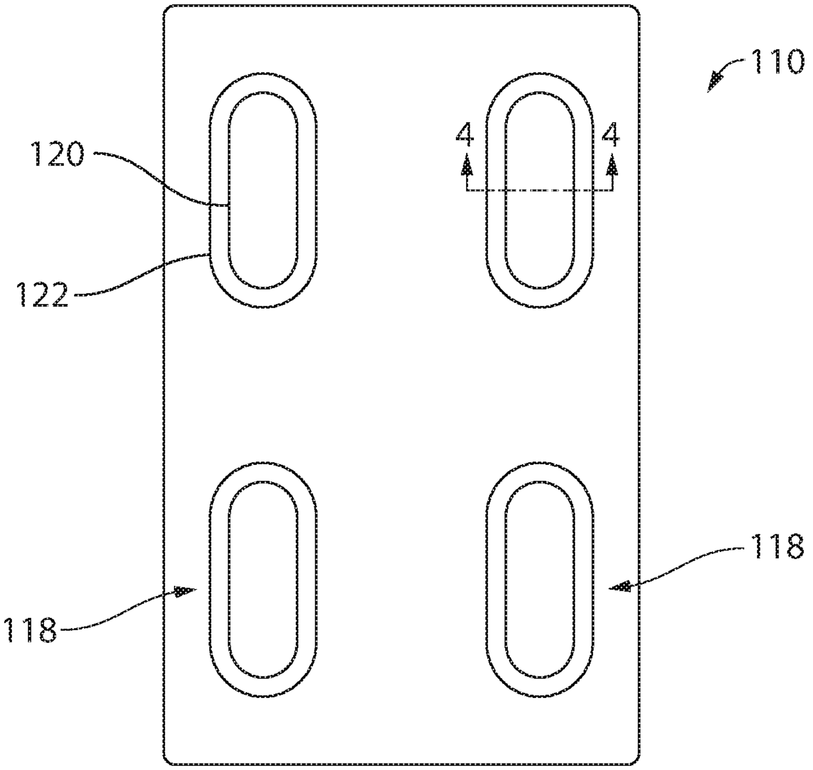
FIG. 3 is a top plan view of a blister pack according to one embodiment of the presently disclosed technology, wherein a base portion of a single blister or sealed cavity is larger, wider and/or longer than a blister portion thereof.
Figure 4:
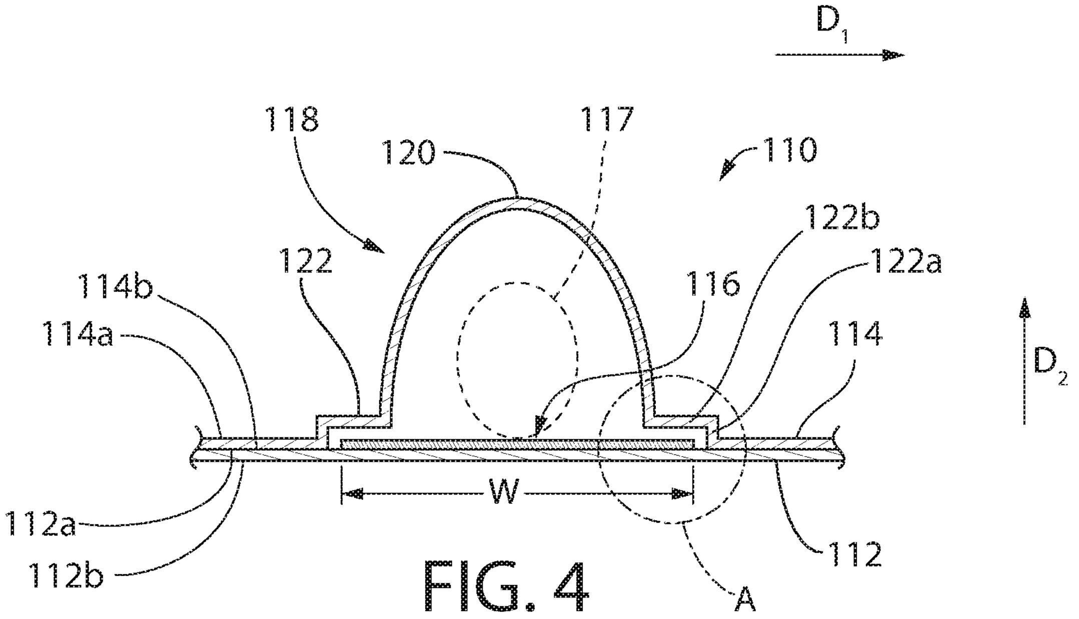
FIG. 4 is a cross-sectional side elevation view through line 4-4 of FIG. 3, which shows extruded film having a width greater than a width of an individual blister portion.
Figure 4A:
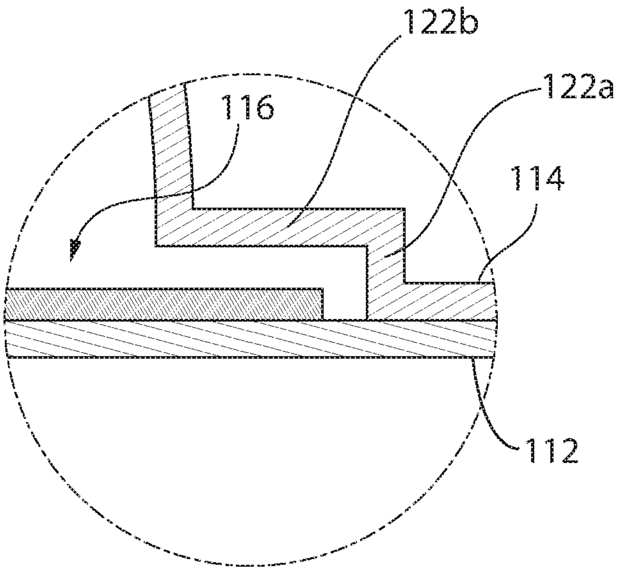
FIG. 4A is a magnified view of section A of FIG. 4.
Figure 5:
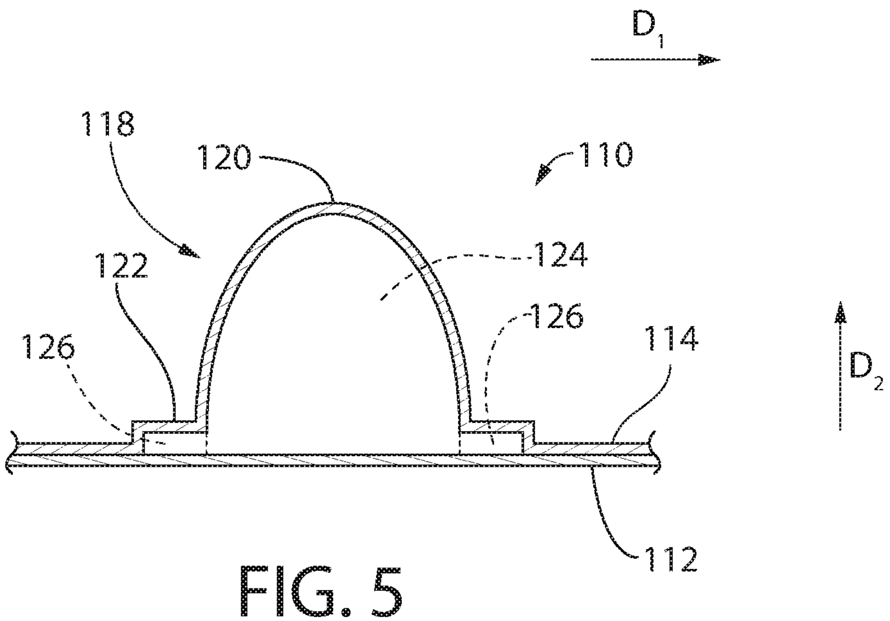
FIG. 5 shows certain components of one embodiment of the presently disclosed technology as shown in FIG. 4, wherein an active member and a product are omitted for clarity and ease of illustration.

Referring now in detail to the various figures, wherein like reference numerals refer to like parts throughout, FIGS. 3-5 illustrate one embodiment of a blister packaging or pack, generally designated 110, of the presently disclosed technology. The blister pack 110 can include a backing 112, a cover 114, and at least one active member 116. The blister pack 110 can enclose, preserve and protect one or more products 117 (shown schematically in FIG. 4), such as oral solid dose medications, vitamins or other nutritional supplements, foodstuff, small consumer goods, probiotics, etc. Such products may be in the form of pills, e.g., tablets, capsules, and the like.

The backing 112 can have a first side or surface 112*a* and an opposing second side or surface 112*b*. Optionally, at least the first side 112*a* of the backing 112 being flat or planar. In one embodiment, each of the first and second sides 112*a*, 112*b* of the backing 112 are flat or planar, such that each of the first and second sides 112*a*, 112*b* extends in a plane, which are at least slightly spaced-apart. In one embodiment, the backing 112 is formed at least in part of foil, such as aluminum foil, and/or of a plastic material. Optionally, the backing 112 can include paperboard.

The cover 114 can have a first side or surface 114*a* and an opposing second side or surface 114*b*. Optionally, at least a portion of the first and second sides 114*a*, 114*b* of the cover 114 are flat or planar. At least a portion of the second side 114*b* of the cover 114 can be attached or adhered, such as by thermoforming or cold forming, to the first side 112*a* of the backing 112 to form a sealed package for containing product(s). The cover 114 can have the same or a different thickness (as measured in the direction of $D_2$) as the backing 112. In one embodiment, the cover 114 is made or formed of a formable web. In one embodiment, the formable web is made from a thermoplastic material, such as a thermoformed film. Optionally, the cover 114 can be formed of polyvinyl chloride (PVC), which can be transparent or opaque. In one embodiment, the cover 114 and/or the backing 112 can be formed on two or more layers.

The cover 114 includes or is formed to have at least one blister, generally designated 118. For example, the cover 114 can include two or more spaced-apart blisters 118. The embodiment shown in FIGS. 3-5 shows the cover 114 having four, spaced-apart, identical blisters 118. However, the cover 114 can have more or fewer blisters and one or more of the blisters can have a different size and/or shape than another one of the blisters 118 of the blister pack 110, depending upon the particular need. Optionally, each blister 118 can have at least a partial egg shape or a bulbous shape. Alternatively, in one embodiment, each blister 118 can have at least a partial plateau shape (e.g., when viewed from the side) or a cylindrical shape. When the cover 114 is attached to the backing 112, a sealed cavity is formed within or by each blister 118.

As shown in FIG. 3, in one embodiment, each blister 118 can define a longitudinal or long axis that extends parallel to at least one outer edge of the blister pack 110. Optionally, and more specifically, the longitudinal axis of each blister 118 can extend parallel to two opposing lateral sides of the blister pack 110 and perpendicularly to top and bottom sides of the blister back, as shown in FIG. 3. However, the arrangement or orientation of the blister(s) 118 within the blister pack 110 is not limited to that shown and described herein, as other configurations are possible depending upon the particular need.

In one embodiment, each blister 118 has a blister or dome portion 120 and a base portion 122. The base portion 122 has a different size, shape, configuration and/or footprint than the dome portion 120. Optionally, at least a section of the base portion 122 extends laterally outwardly beyond the dome portion 120 in the first direction $D_1$. For example, in one embodiment, the base portion 122 has a larger footprint than the dome portion 120, such that the base portion 122 surrounds or encircles the entire dome portion 120 (see FIGS. 3 and 4). In other words, in such an embodiment, the base portion 122 is longer and wider than the dome portion 120. In such a configuration, when viewing the blister pack 110 from above (see FIG. 3), each base portion 122 has the same outer peripheral shape as each dome portion 120, and the difference being that the base portion 122 is larger. Optionally, both the dome portion 120 and the base portion 122 have a generally oval shape when viewed from above (see FIG. 3). In another embodiment, only a section of the base portion 122 extends laterally outwardly beyond the dome portion 120 in the first direction $D_1$, such that the base portion 122 has a different shape than the dome portion 120 when viewed from above.

Optionally, both the dome portion 120 and the base portion 122 extend outwardly (i.e., upwardly) beyond the first side 114*a* of the cover 114 and/or away from the backing 112 in the second direction $D_2$. As shown in FIG. 4, the second direction $D_2$ is perpendicular to the first direction $D_1$. In one embodiment, the dome portion 120 extends outwardly beyond or further than the base portion 122 in the second direction $D_2$ away from the first side 114*a* of the cover 114.

In one embodiment, the dome portion 120 is sized, shaped and/or configured to contain product 117 therein, while the base portion 122 is not. In other words, in such an embodiment, the size, shape and/or configuration of the base portion 122 does not permit product(s) 117 to be positioned therein. More particularly, the combined cover 114 attached to the backing 112 forms a cavity therebetween within each blister 118. As shown in FIG. 5, the cavity can include at least a product compartment 124 and a base compartment 126. In one embodiment, at least a section of the base compartment 126 extends outwardly beyond the product compartment in the first direction $D_1$. In one embodiment, the product 117 is positioned entirely in the product compartment 124. At least a first portion (e.g., a mid-section) of the active member 116 is positioned in or below the product compartment 124 and/or the product 117, and at least a second portion (e.g., one or both outer or lateral ends and/or the outer periphery thereof) of the active member 116 is positioned in the base compartment 126.

Optionally, as shown in FIG. 4, the dome portion 120 can have the shape of an arch in cross-section, while the base portion 122 can be rectilinear, square or rectangular in shape. In other words, in one embodiment, the shape of the dome portion 120 is distinct from that of the base portion 122, such that the base portion 122 does not continue the shape or angle or trajectory of the dome portion 120. The base portion 122 separates the dome portion 120 from a remainder of the cover 114, or the base portion 122 attaches the dome portion 120 to the remainder of the cover 114. In one embodiment, the base portion 122 includes a flat or linear sidewall 122*a* and a flat or linear top wall 122*b*, and the dome portion 120 has an entirely arcuate or bulbous shape. Optionally, as shown in FIG. 4, the sidewall 122*a* of the base portion 122 can extend perpendicularly to the top wall 122*b* of the base portion 122. The top wall 122*b* of the base portion 122 can attach or connect the sidewall 122*a* of the base portion 122 to the dome portion 120.

Figure 1:
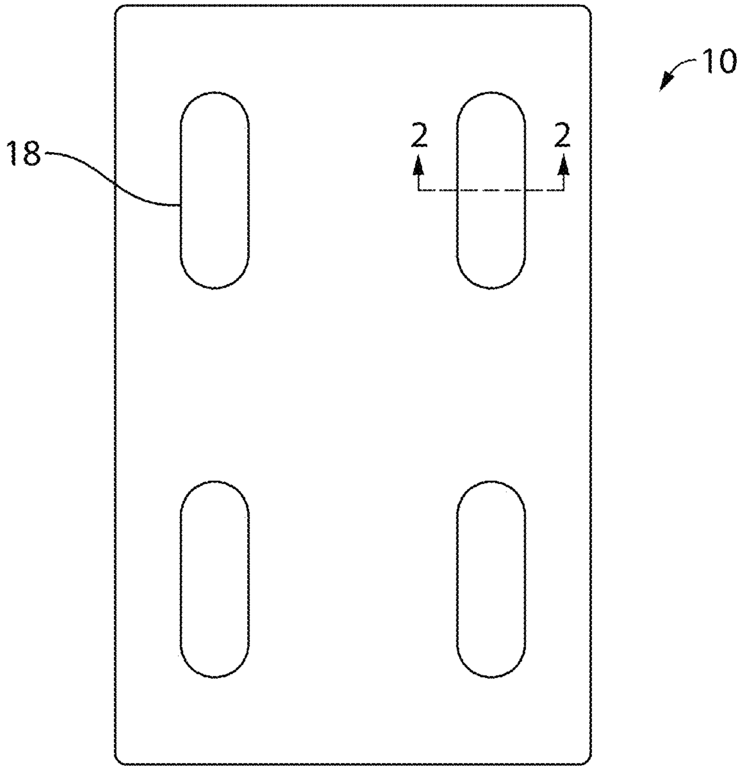
FIG. 1 (PRIOR ART)
FIG. 1 is a top plan view of a blister pack of the prior art.
Figure 2:
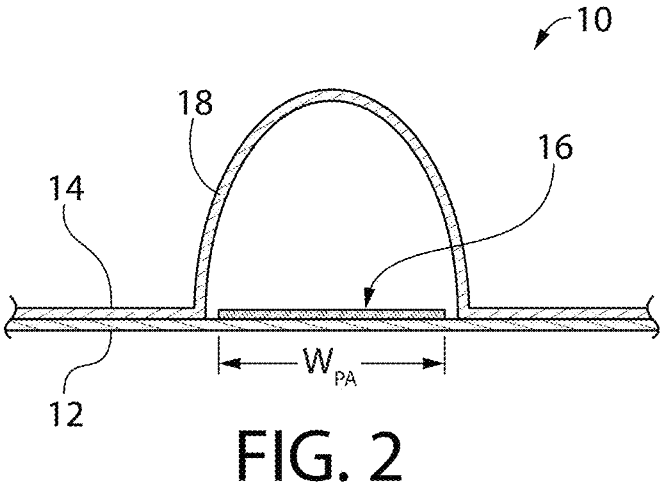
FIG. 2 (PRIOR ART)
FIG. 2 is a cross-sectional view through line 2-2 of FIG. 1, which shows extruded film having a width less than that of a width of an individual blister.

Optionally, the dome portion 120 has approximately or exactly the same size and/or shape as the blister 18 of the prior art (see FIG. 2). However, in such an embodiment, the blister 118 of the present embodiment is distinguishable from the blister 18 of the prior art in that the blister 118 of the present embodiment includes the base portion 122.

In one embodiment, at least one active member 116 is positioned within at least the base portion 122 of each blister 118. More specifically, as mentioned above, in one embodiment at least one active member 116 can be in both the base portion 122 and the dome portion 120 of the blister 118. In one embodiment, the active member 116 can be in the form of an extruded film, such as a desiccant entrained polymer film or an oxygen scavenger entrained polymer film. Optionally, each active member 116 can be in the form of a rectangular or square piece of film, as shown in FIG. 4. However, the active member(s) 116 is not limited to the particular size, shape and/or configuration shown and described herein, as other shapes, for example, can be employed.

Optionally, the active member 116 is adhered, e.g., using an adhesive, to the first side 112*a* of the backing 112. For example, the active member 116 can include a first or top side and an opposing second or bottom side. The second side of the active member 116 can contact the first side 112*a* of the backing 112.

Alternatively, the active member 116 can be heat staked (without an adhesive) to the first side 112*a* of the backing 112. The process of heat staking film onto a substrate is described in detail in U.S. Pat. No. 8,142,603, which is incorporated herein by reference in its entirety.

As another alternative, the active member 116 is not adhered to the backing 112. In such an embodiment, the active member 116 is loosely placed in the blister 118 after the product 117 is placed in the blister 118. In one embodiment, the active member 116 is approximately 0.3 mm in thickness or height (i.e., the direction perpendicular to the backing 112 shown in FIG. 4).

As shown in FIG. 4, in one embodiment, a width W of the active member 116 is at least slightly less than a width of the base portion 122. Similarly and optionally, a length of the active member 116 is at least slightly less than a length of the base portion 122. However, the width W and/or length of the active member 116 is at least slightly greater than that of the dome portion 120. As evident when comparing FIG. 2 to FIG. 4, the width W of the active member 116 is greater than a width $W_{PA}$ of the active member 16. In one embodiment, the width W and/or the length of the active member 116 is significantly greater than the width and/or the length of the dome portion 120. For example, the difference in width and/or length between the dome portion 120 and the active member 116 can be greater (such as two times greater) than the difference in width and/or length between the base portion 122 and the active member 116. In another embodiment in which each active member 116 is not rectangular or square in shape, an entire outer periphery, or at least a portion of the outer periphery, of each active member 116 is greater than that of the respective dome portion 120.

Thus, the blister 118 of the presently disclosed technology provides a larger surface area for active material than the blister 18 of the prior art would provide. This, in turn, facilitates greater activity (e.g., moisture absorption in the case of a desiccant film) than would be provided with a surface area of active film limited to the confines of the profile of the prior art blister 18 alone.

In one embodiment, each active material 116 contains a desiccant. This would be an embodiment where moisture absorption is desired. However, where moisture absorption is not desired, the active member 116 can include alternative active agents. For example, in another embodiment, the active member 116 contains a material selected from the group consisting of activated carbon, carbon black, ketcham black and diamond powder. In a further embodiment, an active agent including one or more layers of the active member 116 contains a material such as absorption microspheres, BaTiO3, SrTiO3, SiO2, Al2O3, ZnO, TiO2, MnO, CuO, Sb2O3, silica, calcium oxide and ion exchange resins. In yet another embodiment, the absorbing agent containing layer of the active member 116 contains two or more types of absorbing agents. The suitable absorbing agent is chosen so as to achieve absorption of the desired vapor or gas for the desired end use (e.g. absorption of moisture, oxygen, carbon dioxide, nitrogen or other undesired gases or vapors).

The active member 116 (whether desiccant, oxygen scavenger, a releasing material or agent, etc., or combination thereof) is capable of acting on, interacting with or reacting with a selected material (e.g., moisture or oxygen).

Examples of such actions or interactions may include absorption, adsorption (sorption, generally) or release of the selected material.

The active member 116 can include an "active agent" in a base material. The active agent (i) can be immiscible with the base material (e.g., polymer) and when mixed and heated with the base polymer and a channeling agent, will not melt, i.e., has a melting point that is higher than the melting point for either the base polymer or the channeling agent, and/or (ii) acts on, interacts or reacts with a selected material. The term "active agent" may include but is not limited to materials that absorb, adsorb or release the selected material(s). Active agents according to the presently disclosed technology may be in the form of particles such as minerals (e.g., molecular sieve or silica gel, in the case of desiccants), but the presently disclosed technology should not be viewed as limited only to particulate active agents. For example, in some embodiments, an oxygen scavenging formulation may be made from a resin which acts as, or as a component of, the active agent.

As used herein, the term "base material" is a component (preferably a polymer) of an entrained active material, other than the active agent, that provides structure for the entrained material.

As used herein, the term "base polymer" is a polymer optionally having a gas transmission rate of a selected material that is substantially lower than, lower than or substantially equivalent to, that of the channeling agent. By way of example, such a transmission rate would be a water vapor transmission rate in embodiments where the selected material is moisture and the active agent is a water absorbing desiccant. The primary function of the base polymer is to provide structure for the entrained polymer. Suitable base polymers may include thermoplastic polymers, e.g., polyolefins such as polypropylene and polyethylene, polyisoprene, polybutadiene, polybutene, polysiloxane, polycarbonates, polyamides, ethylene-vinyl acetate copolymers, ethylene-methacrylate copolymer, poly(vinyl chloride), polystyrene, polyesters, polyanhydrides, polyacrylianitrile, polysulfones, polyacrylic ester, acrylic, polyurethane and polyacetal, or copolymers or mixtures thereof.

Referring to such a comparison of the base polymer and channeling agent water vapor transmission rate, in one embodiment, the channeling agent has a water vapor transmission rate of at least two times that of the base polymer. In another embodiment, the channeling agent has a water vapor transmission rate of at least five times that of the base polymer. In another embodiment, the channeling agent has a water vapor transmission rate of at least ten times that of the base polymer. In still another embodiment, the channeling agent has a water vapor transmission rate of at least twenty times that of the base polymer. In still another embodiment, the channeling agent has a water vapor transmission rate of at least fifty times that of the base polymer. In still another embodiment, the channeling agent has a water vapor transmission rate of at least one hundred times that of the base polymer.

As used herein, the term "channeling agent" or "channeling agents" is defined as a material that is immiscible with the base polymer and has an affinity to transport a gas phase substance at a faster rate than the base polymer. Optionally, a channeling agent is capable of forming channels through the entrained polymer when formed by mixing the channeling agent with the base polymer. Optionally, such channels are capable of transmitting a selected material through the entrained polymer at a faster rate than in solely the base polymer.

As used herein, the term "channels" or "interconnecting channels" is defined as passages formed of the channeling agent that penetrate through the base polymer and may be interconnected with each other.

As used herein, the term "entrained polymer" is defined as a monolithic material formed of at least a base polymer with an active agent and optionally also a channeling agent entrained or distributed throughout. An entrained polymer thus includes two-phase polymers and three phase polymers. A "mineral loaded polymer" is a type of entrained polymer, wherein the active agent is in the form of minerals, e.g., mineral particles such as molecular sieve or silica gel. The term "entrained material" is used herein to connote a monolithic material comprising an active agent entrained in a base material wherein the base material may or may not be polymeric.

As used herein, the term "monolithic," "monolithic structure" or "monolithic composition" is defined as a composition or material that does not consist of two or more discrete macroscopic layers or portions. Accordingly, a "monolithic composition" does not include a multi-layer composite.

As used herein, the term "phase" is defined as a portion or component of a monolithic structure or composition that is uniformly distributed throughout, to give the structure or composition it's monolithic characteristics.

As used herein, the term "selected material" is defined as a material that is acted upon, by, or interacts or reacts with an active agent and is capable of being transmitted through the channels of an entrained polymer. For example, in embodiments in which a desiccant is used as an active agent, the selected material may be moisture or a gas that can be absorbed by the desiccant. In embodiments in which a releasing material is used as an active agent, the selected material may be an agent released by the releasing material, such as moisture, fragrance, or an antimicrobial agent (e.g., chlorine dioxide). In embodiments in which an adsorbing material is used as an active agent, the selected material may be certain volatile organic compounds and the adsorbing material may be activated carbon.

As used herein, the term "three phase" is defined as a monolithic composition or structure comprising three or more phases. An example of a three phase composition according to the presently disclosed technology would be an entrained polymer formed of a base polymer, active agent, and channeling agent. Optionally, a three phase composition or structure may include an additional phase, e.g., a colorant.

Entrained polymers may be two phase formulations (i.e., comprising a base polymer and active agent, without a channeling agent) or three phase formulations (i.e., comprising a base polymer, active agent and channeling agent). Entrained polymers are described, for example, in U.S. Pat. Nos. 5,911,937, 6,080,350, 6,124,006, 6,130,263, 6,194,079, 6,214,255, 6,486,231, 7,005,459, and U.S. Pat. Pub. No. 2016/0039955, each of which is incorporated herein by reference in its entirety.

An entrained material or polymer includes a base material (e.g., polymer) for providing structure, optionally a channeling agent and an active agent. The channeling agent forms microscopic interconnecting channels through the entrained polymer. At least some of the active agent is contained within these channels, such that the channels communicate between the active agent and the exterior of the entrained polymer via microscopic channel openings formed at outer surfaces of the entrained polymer. The active agent can be, for example, any one of a variety of absorbing, adsorbing or releasing materials, as described in further detail below. While a channeling agent is preferred, the invention broadly includes entrained materials that optionally do not include channeling agents, e.g., two phase polymers.

In any embodiment, suitable channeling agents may include a polyglycol such as polyethylene glycol (PEG), ethylene-vinyl alcohol (EVOH), polyvinyl alcohol (PVOH), glycerin polyamine, polyurethane and polycarboxylic acid including polyacrylic acid or polymethacrylic acid. Alternatively, the channeling agent can be, for example, a water insoluble polymer, such as a propylene oxide polymerisate-monobutyl ether, such as Polyglykol B01/240, produced by CLARIANT. In other embodiments, the channeling agent could be a propylene oxide polymerisate monobutyl ether, such as Polyglykol B01/20, produced by CLARIANT, propylene oxide polymerisate, such as Polyglykol D01/240, produced by CLARIANT, ethylene vinyl acetate, nylon 6, nylon 66, or any combination of the foregoing.

Suitable active agents according to the presently disclosed technology include absorbing materials, such as desiccating compounds. If the active agent is a desiccant, any suitable desiccant for a given application may be used. Typically, physical absorption desiccants are preferred for many applications. These may include molecular sieves, silica gels, clays and starches. Alternatively, the desiccant may be a chemical compound that forms crystals containing water or compounds which react with water to form new compounds.

Optionally, in any embodiment, the active agent may be an oxygen scavenger, e.g., an oxygen scavenging resin formulation.

Figure 6A:
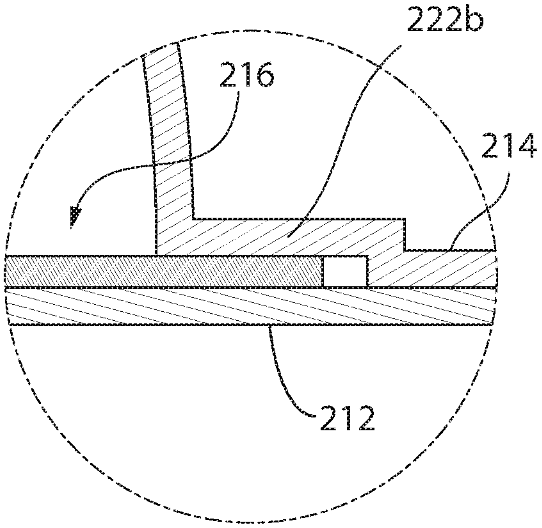
FIG. 6A is a magnified view of section A of FIG. 6.
Figure 6:
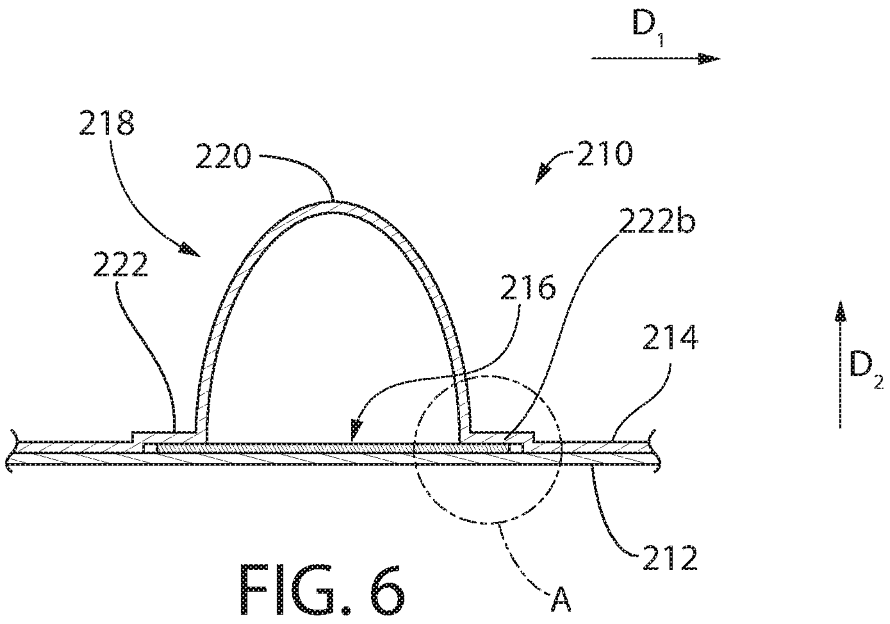
FIG. 6 is a cross-sectional side elevation view of another embodiment of the presently disclosed technology, wherein the view is the same as that of FIG. 4.

FIGS. 6 and 6A show another embodiment of the presently disclosed technology. Similar or identical structure as between the embodiment of FIGS. 3-5 and the embodiment of FIGS. 6-6A is distinguished in FIGS. 6-6A by a reference number with a magnitude one hundred (100) greater than that of FIGS. 3-5. Description of certain similarities between the embodiment of FIGS. 3-5 and the embodiment of FIGS. 6-6A may be omitted herein for convenience and brevity only.

As shown in FIGS. 6 and 6A, at least a portion of a top side or surface of the active member 216 can contact and/or engage at least a portion of an interior surface (underside) of the top wall 222*b* of the base portion 222 of the blister 218. Optionally, despite this contact, the active member 216 is not (or is only minimally) compressed when positioned in the base portion 222. As such, the contact preferably does not create an air tight seal between the engaged surfaces, so that air may be accessible therebetween. This would thus enable portions of the active member 216 contacting the top wall 222*b* to absorb or adsorb, for example, components (e.g., moisture or oxygen) in the air between the engaged surfaces. The contact between the surfaces may result from the base portion 222 having a lower or smaller thickness or height (as shown in FIG. 6), or the result of the active member 216 being thicker or having a greater height. This configuration permits the concealed active member 216 to have the same or similar active properties or capabilities as the active member 116 of the earlier embodiment. In other words, the functionality of the active member 216 is not hampered by the contact between the active member 216 and the base portion 222.

Figure 7:
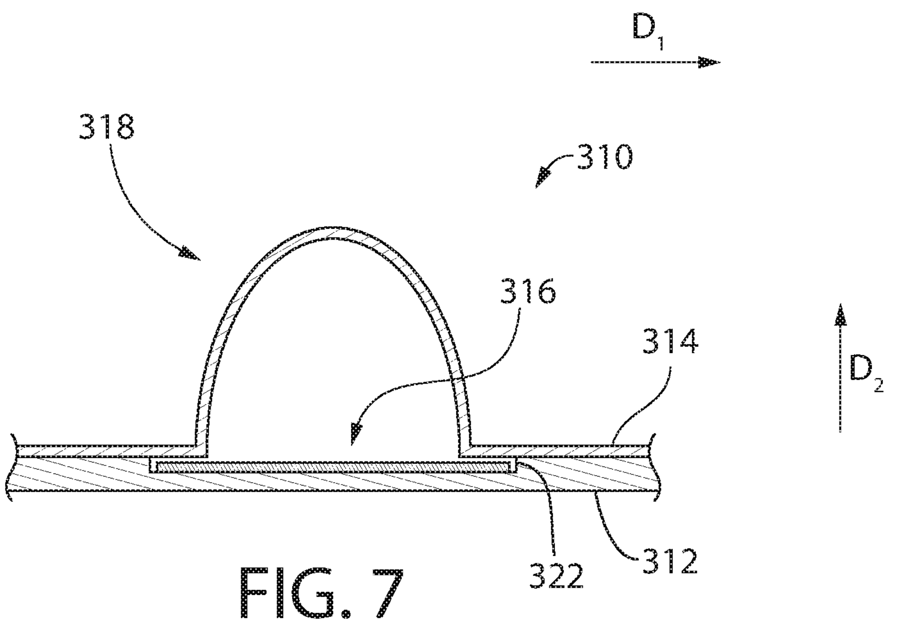
FIG. 7 is a cross-sectional side elevation view of another embodiment of the presently disclosed technology, wherein the view is the same as that of FIG. 4.

FIG. 7 shows another embodiment of the presently disclosed technology. Similar or identical structure as between the embodiment of FIGS. 3-5 and the embodiment of FIG. 7 is distinguished in FIG. 7 by a reference number with a magnitude two hundred (200) greater than that of FIGS. 3-5. Description of certain similarities between the embodiment of FIGS. 3-5 and the embodiment of FIG. 7 may be omitted herein for convenience and brevity only.

As shown in FIG. 7, the base portion 322 can be formed in or by the backing 312. Thus, the blister 318 (without a base portion, as described above) can be formed in the cover 314 and the base portion 322 can be formed in the backing 312. In this embodiment, the base portion 322 can be a depression or cut-out formed in the top surface of the backing 312. Optionally, the base portion 322 can be entirely in the backing 312. In another option, the base portion can be partially formed in the backing and partially formed in the cover. Regardless, the cover 314 attached to the backing 312 forms at least one sealed cavity for containing product. The sealed cavity includes a dome portion or the blister 318 and a base portion 322.

The presently disclosed technology includes methods of making and/or using the blister packs 110, 210. One of the methods includes (i) providing and/or forming a cover 114, 214 having at least one blister 118, 218 with one or more of the features described above, (ii) placing a product 117 in each blister 118, 218, (iii) placing active material 116, 216 in each blister 118, 218, and (iv) attaching or bonding a backing 112, 212 to the cover 114, 214 to form a sealed package around the product 117. As used herein, the term "providing" is broadly defined to include receiving, taking and/or using. When a user wishes to access the product 117, at least a portion of the backing 112, 212 can be separated from the cover 114, 214 or broken through to expose the product 117.

While the presently disclosed technology has been described in detail and with reference to specific examples thereof, it will be apparent to one skilled in the art that various changes and modifications can be made therein without departing from the spirit and scope thereof. It is understood, therefore, that the presently disclosed technology is not limited to the particular embodiments disclosed, but it is intended to cover modifications within the spirit and scope of the present presently disclosed technology as defined by the appended claims.

What is claimed is:

1. A blister pack configured to absorb or adsorb moisture therein, the blister pack comprising:

a backing;

a cover attached to the backing, the cover and backing in combination forming at least one sealed cavity, the sealed cavity including a dome portion and a base portion, at least a section of the base portion extending beyond the dome portion in a first direction, the dome portion extending beyond an outer peripheral portion of the cover in a second direction, the second direction being perpendicular to the first direction, wherein the base portion includes a sidewall and a top wall;

a moisture-absorbing or moisture-adsorbing desiccant entrained polymer film within at least the base portion of the sealed cavity, the moisture-absorbing or moisture-adsorbing desiccant entrained polymer film being heat staked to the backing, at least a portion of the moisture-absorbing or moisture-adsorbing desiccant entrained polymer film contacting an interior surface of the top wall of the base portion of the cover; and a single pill positioned entirely within the dome portion of the sealed cavity.

2. The blister pack of claim 1, wherein the base portion extends beyond the outer peripheral portion of the cover in the second direction.

3. The blister pack of claim 1, wherein at least a first portion of the moisture-absorbing or moisture-adsorbing desiccant entrained polymer film is positioned in the base portion of the cavity, and wherein at least a second portion of the moisture-absorbing or moisture-adsorbing desiccant entrained polymer film is positioned in or beneath the dome portion of the cavity.

4. The blister pack of claim 1, wherein the base portion is formed by a depression or cut-out in at top surface of the backing, an entirety of a bottom surface of the backing extending in a single plane that is parallel to and spaced-apart from an entirety of the top surface of the backing, the depression or cut-out receiving the moisture-absorbing or moisture-adsorbing desiccant entrained polymer film therein.

5. The blister pack of claim 1, wherein the dome portion extends outwardly beyond the base portion in the second direction.

6. The blister pack of claim 1, wherein the cover is formed of at least one of a thermoformed film and transparent polyvinyl chloride (PVC).

7. The blister pack of claim 1, wherein the moisture-absorbing or moisture-adsorbing desiccant entrained polymer film includes a first side and an opposing second side, the second side of the moisture-absorbing or moisture-adsorbing desiccant entrained polymer film contacting the backing, at least a portion of the first side of the extruded film contacting an interior surface of the top wall of the base portion of the blister.

8. The blister pack of claim 1, wherein the at least one sealed cavity includes at least two spaced-apart sealed cavities.

9. The blister pack of claim 8, wherein a longitudinal axis of the blister extends parallel to an outer edge of the backing.

10. A blister pack configured to absorb or adsorb moisture therein, the blister pack comprising;

a backing;

a cover attached to the backing, the cover and backing in combination forming at least one sealed cavity for containing product, the sealed cavity including a dome portion and a base portion, at least a section of the base portion extending beyond the dome portion in a first direction, the dome portion extending beyond an outer peripheral portion of the cover in a second direction, the second direction being perpendicular to the first direction, wherein the base portion includes a sidewall and a top wall; and a moisture-absorbing or moisture-adsorbing desiccant entrained polymer film within at least the base portion of the sealed cavity, the moisture-absorbing or moisture-adsorbing desiccant entrained polymer film being heat staked to the backing, at least a portion of the moisture-absorbing or moisture-adsorbing desiccant entrained polymer film contacting an interior surface of the top wall of the base portion of the cover, the moisture-absorbing or moisture-adsorbing desiccant entrained polymer film being an extruded film including a base material and an active agent, wherein the sidewall and the top wall of the base portion are both flat, and wherein the dome portion is entirely arcuate.

11. The blister pack of claim 10, wherein the base material is a thermoplastic polymer selected from the group consisting of polypropylene, polyethylene, polyisoprene, polybutadiene, polybutene, polysiloxane, polycarbonate, polyamide, ethylene-vinyl acetate copolymer, ethylene-methacrylate copolymer, poly(vinyl chloride), polystyrene, polyesters, polyanhydrides, polyacrylianitrile, polysulfones, polyacrylic ester, acrylic, polyurethane, polyacetal, copolymers thereof, and mixtures thereof.

12. A blister pack configured to absorb or adsorb moisture therein, the blister pack comprising:

a foil backing having a first side and an opposing second side, at least one depression formed in the first side of the backing, an entirety of the second side of the backing extending in a single plane that is parallel to and spaced-apart from an entirety of the first side of the backing;

a thermoplastic cover having a first side and an opposing second side, at least a portion of the second side of the cover being attached to the first side of the backing, the cover and backing in combination forming at least two spaced-apart sealed cavities, each sealed cavity having a dome portion and a base portion, at least a part of the base portion being formed by the depression in the first side of the backing and at least a part of the base portion being formed by the cover, at least a section of each base portion extending laterally outwardly beyond the respective dome portion in a first direction, each dome portion extending upwardly beyond an outer peripheral portion of the cover in a second direction, the second direction being perpendicular to the first direction;

an active member in the form of extruded film including a moisture-absorbing or moisture-adsorbing desiccant, the active member being heat staked to the foil backing, at least a first portion of the active member being positioned in the base portion of at least one of the cavities, the depression receiving the active member therein, at least a second portion of the active member being positioned in or beneath the dome portion of the at least one of the cavities; and a plurality of pills stored in the blister pack, wherein each sealed cavity contains a single pill of the plurality of pills, each pill of the plurality of pills being located in the dome portion of each respective sealed cavity, each pill of the plurality of pills comprising a medicine, a nutritional supplement, or a probiotic.

13. The blister pack of claim 12, wherein each base portion includes a sidewall and a top wall, wherein the sidewall and the top wall of each base portion are flat, wherein each dome portion is entirely arcuate.

14. The blister pack of claim 12, wherein at least a first portion of each active member is positioned in the base portion of one of the sealed cavities, at least a second portion of each active member is positioned in or beneath the dome portion of one of the sealed cavities.

15. The blister pack of claim 12, wherein the extruded film is adhered to the first side of the backing.

16. The blister pack of claim 12, wherein the extruded film includes a first side and an opposing second side, the second side of the extruded film contacting the first side of the backing, at least a portion of the first side of the extruded film contacting an interior surface of the base portion of each blister.

17. The blister pack of claim 12, wherein the active member includes a base material.

18. The blister pack of claim 17, wherein the base material is a thermoplastic polymer.

19. The blister pack of claim 12, wherein a longitudinal axis of each blister extends parallel to an outer edge of the backing.

* * * * *